(12) United States Patent
He

(10) Patent No.: US 10,478,007 B2
(45) Date of Patent: Nov. 19, 2019

(54) ON-BOARD COFFEE PROCESSOR

(71) Applicant: Zhixiong He, Guangdong (CN)

(72) Inventor: Zhixiong He, Guangdong (CN)

( * ) Notice: Subject to any disclaimer, the term of this patent is extended or adjusted under 35 U.S.C. 154(b) by 337 days.

(21) Appl. No.: 15/512,064

(22) PCT Filed: Oct. 22, 2014

(86) PCT No.: PCT/CN2014/089111
§ 371 (c)(1),
(2) Date: Mar. 16, 2017

(87) PCT Pub. No.: WO2016/041231
PCT Pub. Date: Mar. 24, 2016

(65) Prior Publication Data
US 2017/0280919 A1  Oct. 5, 2017

(30) Foreign Application Priority Data
Sep. 21, 2014 (CN) .......................... 2014 1 0481492

(51) Int. Cl.
| | |
|---|---|
| *A47J 31/043* | (2006.01) |
| *A47J 31/30* | (2006.01) |
| *A47J 31/58* | (2006.01) |
| *B60N 3/16* | (2006.01) |
| *A47J 31/00* | (2006.01) |
| *A47J 31/44* | (2006.01) |

(52) U.S. Cl.
CPC ............. *A47J 31/30* (2013.01); *A47J 31/005* (2013.01); *A47J 31/306* (2013.01); *A47J 31/44* (2013.01); *A47J 31/58* (2013.01); *B60N 3/16* (2013.01); *A47J 31/043* (2013.01)

(58) Field of Classification Search
CPC ....... A47J 31/306; A47J 31/303; A47J 31/043
USPC .......................................................... 99/303
See application file for complete search history.

(56) References Cited

U.S. PATENT DOCUMENTS

| | | | | | |
|---|---|---|---|---|---|
| 5,467,695 | A | * | 11/1995 | Keller | A47J 37/0781 126/39 H |
| 6,062,127 | A | * | 5/2000 | Klosinski | A47J 31/005 99/295 |
| 6,536,331 | B2 | * | 3/2003 | Jorgensen | A47J 31/047 99/292 |
| 7,032,506 | B2 | * | 4/2006 | Scott | A47J 31/306 99/281 |
| 7,458,316 | B2 | * | 12/2008 | Scelza | A47J 31/005 126/609 |
| 9,743,797 | B2 | * | 8/2017 | Richardson | A47J 31/0576 |
| 2005/0023268 | A1 | * | 2/2005 | Bardazzi | A47J 31/306 219/432 |

(Continued)

*Primary Examiner* — Reginald Alexander

(57) ABSTRACT

An on-board coffee processor having a boiling cup, a coffee bucket, a distill cup and a lid; the upper end of boiling cup is connected with the lower end of distill cup; the coffee bucket is arranged at the rim of boiling cup; the distill cup is provided with a distill tube; the lower end of the tube leads to the coffee bucket from the bottom of distill cup and the upper end of the tube leads to the upper part of distill cup; the lid is connected to the upper end of distill cup, and the bottom of the said boiling cup is set up with a heating plate and a thermistor is installed at the bottom of the heating plate. The on-board coffee processor has the boiling cup, the coffee bucket and the distill cup arranged from bottom to top; the boiling cup has a heating device.

10 Claims, 5 Drawing Sheets

(56) References Cited

U.S. PATENT DOCUMENTS

2013/0213240 A1\* 8/2013 O'Brien .................. A47J 31/38
99/297

\* cited by examiner

ON-BOARD COFFEE PROCESSOR

BACKGROUND OF THE INVENTION

The present invention pertains to an on-board electric heating & containing device, and more particularly, to an on-board coffee processor.

China Patent No. CN201320775935.8 has disclosed an electric heating on-board coffee cup on Aug. 27, 2014, including the cup body. The said cup body is provided with a heating device at the lower end; the heating device is composed of an electric heating element and a temperature adjusting device; the electric heating element is arranged at the bottom end face of cup body; the heating device is provided with a temperature probe; the temperature probe is placed in the cup at one end and connected with the temperature adjusting device at the other end; the heating device is set up with a power base at the lower end which is electrically connected with the mating connector; the said cup body is equipped with an on-board fixing frame in vehicle; the cup body and power base are orderly arranged on the on-board fixing frame. The electric heating on-board coffee cup cannot prepare or brew coffee, it is just container that can heat coffee beverage and keep its temperature.

BRIEF SUMMARY OF THE INVENTION

The present invention is intended to overcome the defects of the prior art and provide a simple-structured on-board coffee processor with reasonable & convenient operation and self-heating device, which can produce high-temperature steam to brew coffee.

The present invention is realized by the following technical scheme:

The on-board coffee processor is characterized in that it consists of a boiling cup, a coffee bucket, a distill cup and a lid; the upper end of boiling cup is connected with the lower end of distill cup; the coffee bucket is arranged at the rim of boiling cup; the distill cup is provided with a distill tube; the lower end of the tube leads to the coffee bucket at the bottom of distill cup and the upper end of the tube leads to the upper part of distill cup; the lid is connected to the upper end of distill cup, and the bottom of the said boiling cup is set up with a heating plate and a thermistor is installed at the bottom of the heating plate.

The present invention can also be solved by using the following technical measures:

As a more specific scheme, the said thermistor is pressed against the bottom of the heating plate by means of a holding block, and a connecting component for fixing the holding block is provided at the bottom of the heating plate.

The said connection component comprises a stud and a nut; the stud is arranged at the bottom of heating plate, and the corresponding stud of holding block is provided with the hole, and the stud is connected with the nut after passing through the hole.

The corresponding thermistor, of the said holding block is arranged with a groove where the thermistor is placed to avoid the movement of thermistor, thereby improving the accuracy of temperature sensing.

The said boiling cup is open at the bottom and the inner side at the lower end of boiling cup is provided with a flange, and the heating plate is pressed against the bottom of flange by the heat-resistant bracket, wherein the primary sealing ring is arranged between the heating plate and the flange; the outer circumference of heat-resistant bracket is connected with the inner side at the lower end of boiling cup by screw-thread fit.

The said boiling cup is set up with a cup seat and a control circuit board at the bottom; the control circuit board is arranged in the cup seat, and the heating plate and the thermistor are electrically connected with the control circuit board.

The said cup seat comprises a top cap, a shell and a bottom cap; the center of top cap is connected with the center of the said heat-resistant bracket by a screw, and the shell is sheathed on the top cap and the outer circumference of bottom cap; the said boiling cup is provided with an upper limit retainer; the bottom cap is installed with a lower limit retainer at the lower end of the corresponding shell; the top cap and the bottom cap are connected by screws, and the shell is crimped between the upper limit retainer and the lower limit retainer.

The wall of the said boiling cup and/or distill cup is a double-layer structure and the inner layer is a vacuum insulation layer. That is to say, the inside of the cup wall is vacuum-treated to form the vacuum insulation layer.

The upper end of the said boiling cup is screwed with the lower end of the distill cup; and the upper end of distill cup is screwed with the lid, wherein the upper ends of boiling cup and the distill cup are provided with external threads; the secondary sealing ring is arranged between the upper end of boiling cup and the lower end of distill cup. When the pressure inside the boiling cup is too high, the secondary sealing ring will lose its sealing effect under high pressure. The pressure inside the boiling cup will be discharged from the connection between the boiling cup and the distill cup to avoid explosion.

The bottom of the said coffee bucket is provided with a steam pipe, which is led to the inside of coffee bucket and boiling cup; the bottom and the top inside the coffee bucket are respectively provided with a lower mesh and an upper mesh. If a better filtering effect is required, the coffee bucket with ground coffee inside can be covered with a layer of filter paper.

The beneficial effects of the invention are as follows:

(1) The on-board coffee processor comprises a boiling cup, a coffee bucket and a distill cup from bottom to top; the boiling cup has a heating device. When preparing the coffee, the boiling cup acts as a steam generator, heating the water inside to form the high temperature and high pressure steam to rush at the ground coffee in the bucket, and then the steam mixed with ground coffee is condensed in the distilling tube of distill cup to form the coffee liquid, which flows into the distill cup from the upper end of distilling tube, thereby realizing the function of making the coffee liquid;

(2) The bottom of heating plate of the boiling cup is provided with a thermistor; the thermistor feeds the real-time temperature signal of heating plate to the control circuit board, and the temperature signal can be converted into a digital signal and displayed by screen;

(3) The control circuit board can control the start and stop of the heating plate according to the temperature signal detected by the thermistor, to prevent the heating without liquid;

(4) The thermistor is pressed against the bottom of heating plate by the holding block to accurately detect the temperature signal of heating plate;

(5) The heating plate is provided with a connecting piece at the bottom, and the holding block is fixed at the bottom of the heating plate through the connecting piece to ensure that the thermistor and the heating plate are connected effectively.

DETAILED DESCRIPTION OF THE INVENTION

Figure 1:
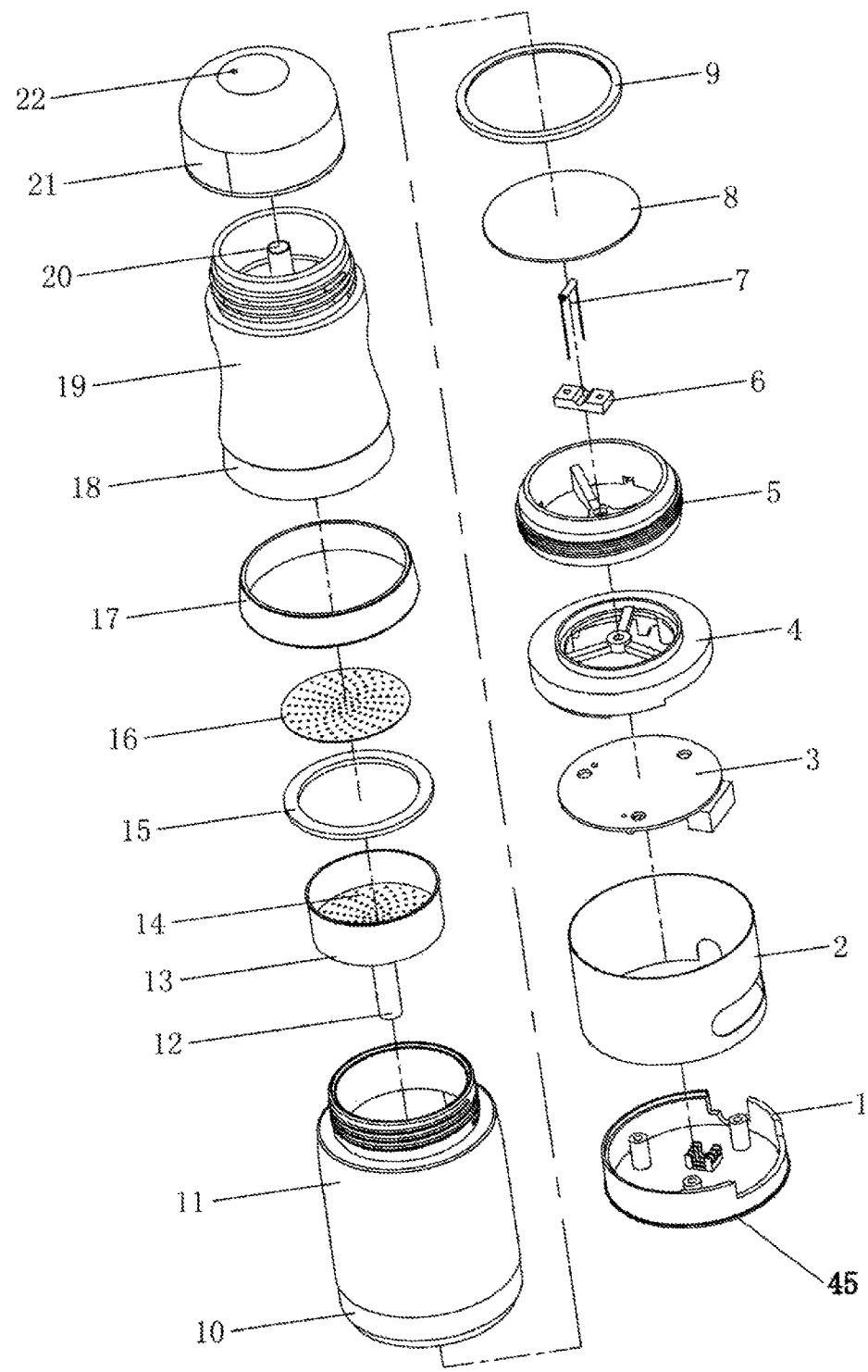
FIG. 1 is the breakdown structure schematic of an example of the present invention
Figure 2:
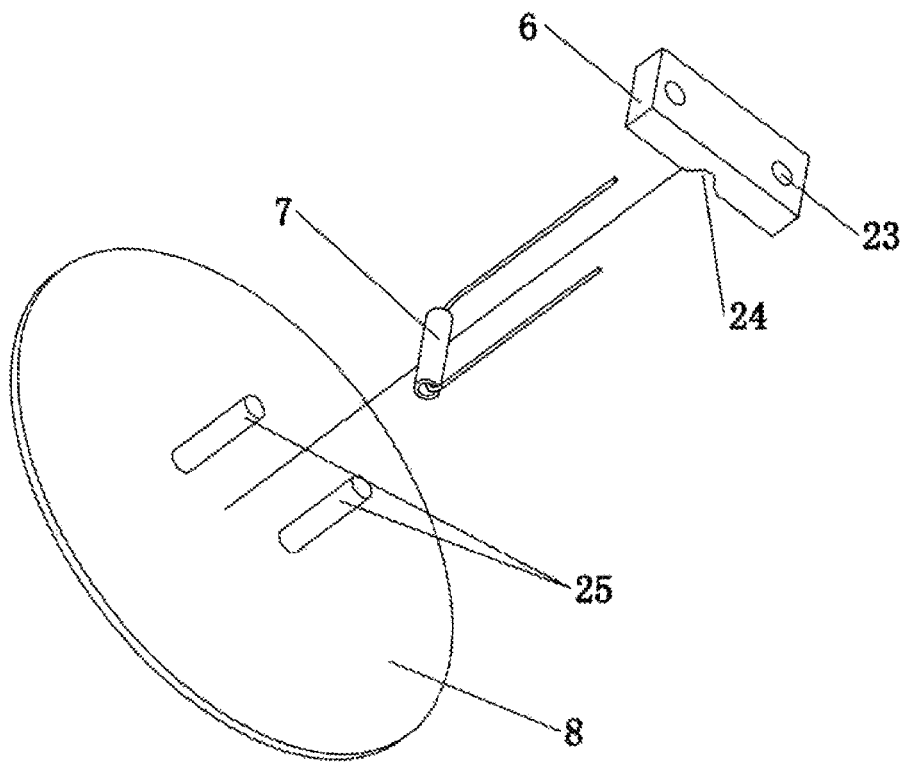
FIG. 2 is the breakdown structure schematic of heating plate, thermistor and holding block of the present invention seen from another point of view.
Figure 3:
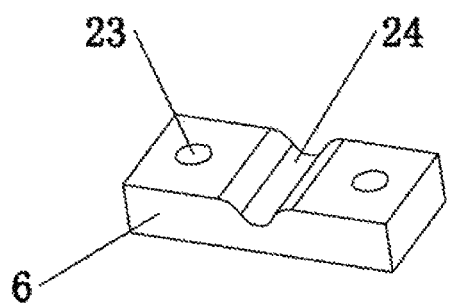
FIG. 3 is the structure schematic of holding block of the present invention.
Figure 4:
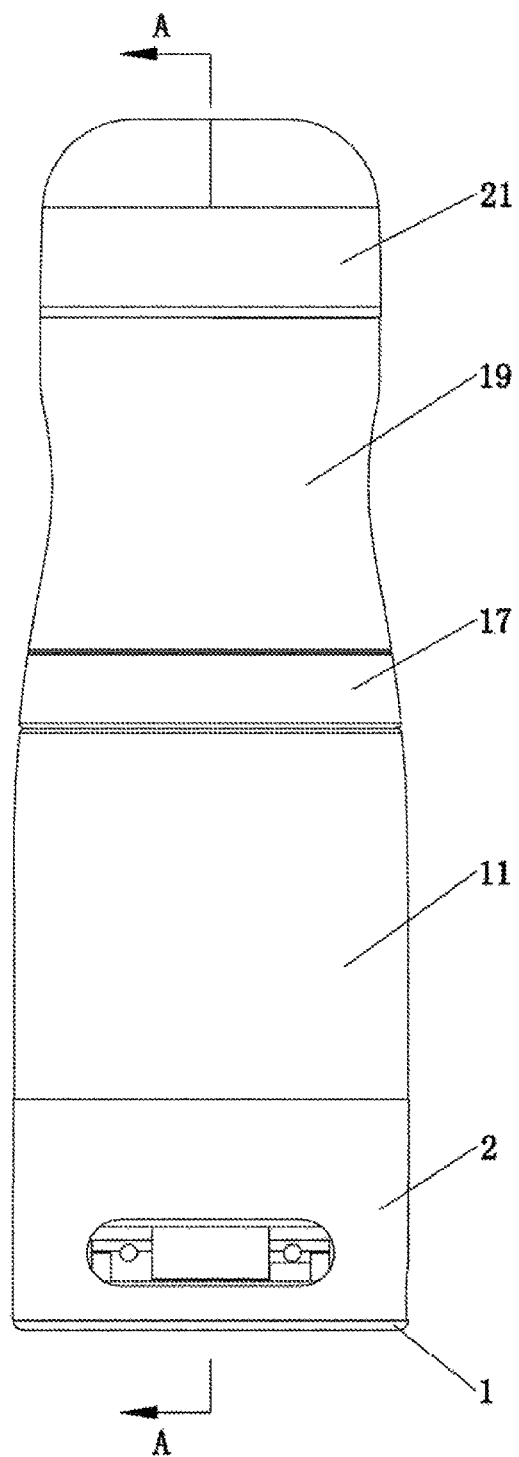
FIG. 4 is the main structure schematic of the present invention.

Here are the further descriptions of the present invention with figures and examples:

See FIG. 1~FIG. 4, an on-board coffee processor consists of a boiling cup 11, a coffee bucket 13, a distill cup 19 and a lid 21; the upper end of boiling cup 11 is connected with the lower end of distill cup 19; the coffee bucket 13 is arranged at the rim of boiling cup 11; the distill cup 19 is provided with a distill tube 20; the lower end of the tube 20 leads to the coffee bucket 13 from the bottom of distill cup 19 and the upper end of the tube 20 leads to the upper part of distill cup 19; the lid 21 is connected to the upper end of distill cup 19, and the said boiling cup 11 is set up with a heating plate at the bottom and a thermistor 7 is installed at the bottom of the heating plate 8.

The said thermistor 7 is pressed against the bottom of the heating plate 8 by means of a holding block 6, and a connecting component for fixing the holding block 6 is provided at the bottom of the heating plate 8.

Figure 5:
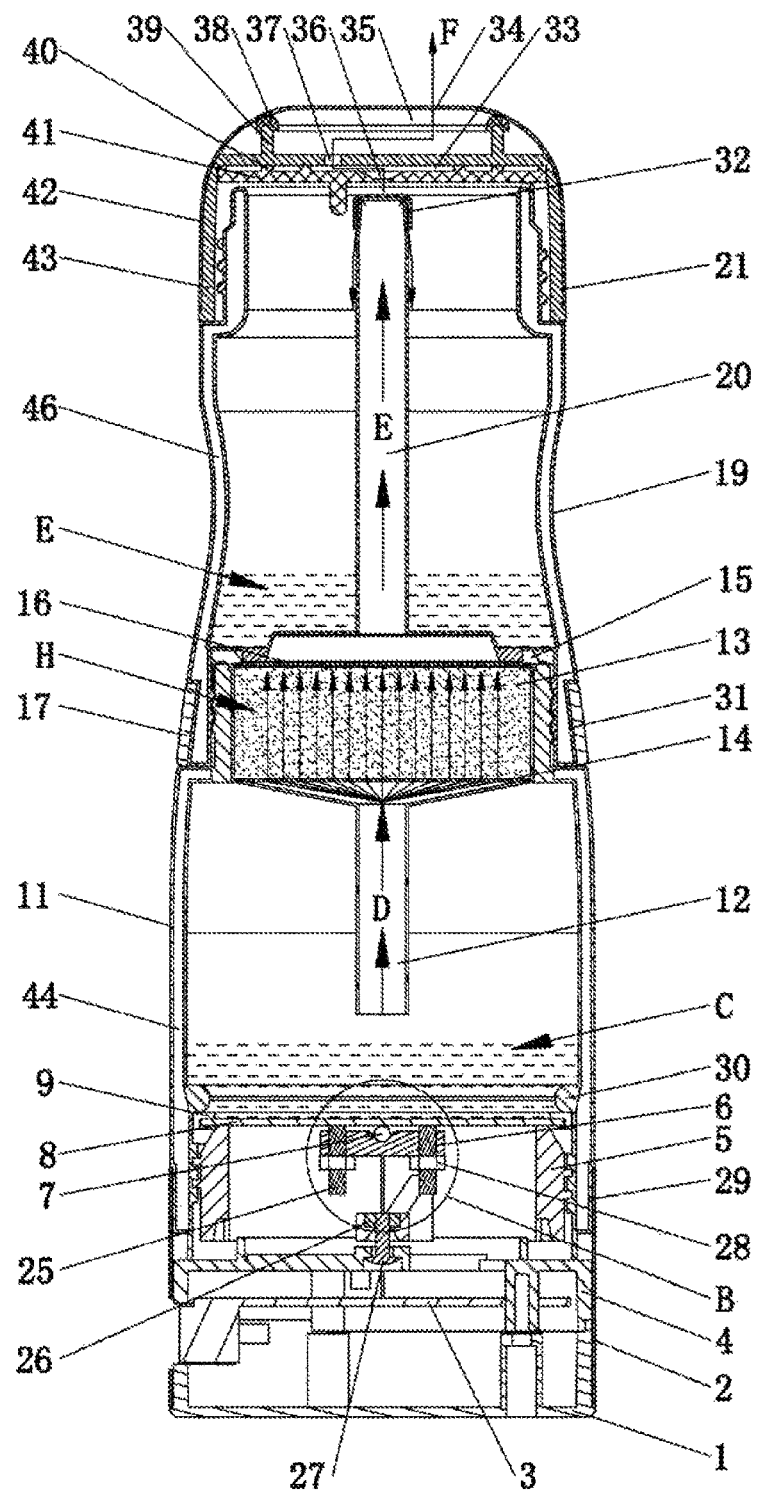
FIG. 5 is the sectional structure schematic of A-A in FIG. 4.
Figure 6:
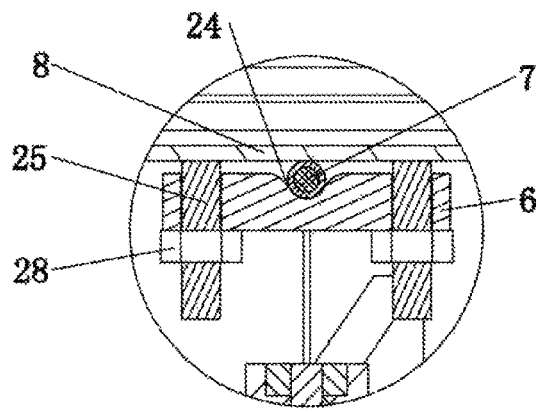
FIG. 6 is the amplified structure schematic of Point B in FIG. 5.

See FIG. 5 and FIG. 6, the said connection component comprises a stud 25 and a nut 28; the stud 25 is arranged at the bottom of heating plate 8, and the corresponding stud 25 of holding block 6 is provided with the hole 23, and the stud 25 is connected with the nut 28 after passing through the hole 23.

The corresponding thermistor 7 of the said holding block 6 is arranged with a groove 24 where the thermistor 7 is placed.

The said boiling cup is open at the bottom and the inner side at the lower end of boiling cup is provided with a flange 30; the heating plate 8 is pressed against the bottom of flange 30 by the heat-resistant bracket 5; wherein the primary sealing ring 9 is arranged between the heating plate 8 and the flange 30; the outer circumference of heat-resistant bracket 5 is connected with the inner side at the lower end of boiling cup 11 by screw-thread fit.

The said boiling cup 11 is set up with a cup seat and a control circuit board 3 at the bottom; the control circuit board 3 is arranged in the cup seat, and the heating plate 8 and the thermistor 7 are electrically connected with the control circuit board 3.

The said cup seat comprises a top cap 4, a shell 2 and a bottom cap 1; the center of top cap 4 is connected with the center of the said heat-resistant bracket 5 by a screw 27, and the shell 2 is sheathed on the top cap and the outer circumference of bottom cap 1; the said boiling cup 11 is provided with an upper limit retainer 10; the bottom cap 1 is installed with a lower limit retainer 45 at the lower end of the corresponding shell 2; the top cap and the bottom cap 1 are connected by screws; and the shell 2 is crimped between the upper limit retainer 10 and the lower limit retainer 45.

The said heat-resistant bracket 5 is set up with a central nut 26 in the center; the top cap 4 is arranged with a central hole; the screw 27 passes through the central hole of top cap 4 from bottom to top and connects to the central nut 26 of heat-resistant bracket 5.

The wall of the said boiling cup 11 and distill cup 19 is a double-layer structure and the inner layer is a vacuum insulation layer 44. Wherein, the outer wall of the said boiling cup 11 and distill cup 19 corresponds to the vacuum insulation layer 44/46 respectively, which is set up with the first evacuation hole 29 and the second evacuation hole 31. The said first evacuation hole 29 is arranged on the surface of upper limit retainer 10 at the lower end of boiling cup 11 to be covered by the shell 2 of cup seat; the outer circumference of the said distill cup 19 is provided with decorative ring 17, which covers the said second evacuation hole 31. The outer circumference at the lower end of distill cup 19 is provided a conical stepped surface 18, the second evacuating hole 31 is arranged outside of the conical stepped surface 18. The said decorative ring 17 is a silicon rubber ring which is sheathed over the conical stepped surface 18 and covers the second evacuation hole 31. In view of the need to open the evacuation hole on the outer surface of the cup, after evacuation, the hole will be blocked; however, the hole edge may become rough when blocking the hole, which may affect the appearance, so, the boiling cup 11 and the distill cup 19 of the present invention cover the rough edge of evacuation hole on the surface by using the cup seat shell 2 and the decorative ring 17, respectively.

In addition, since the decorative ring 17 is a silicon rubber ring, when the distill cup 19 falls to the ground, the silicon rubber ring functions as a cushion and greatly reduces the chance of breaking. Further, since the decorative ring 17 has a certain taper at the mating portion of the distill cup 19, it can prevent the decorative ring 17 from falling out.

Figure 7:
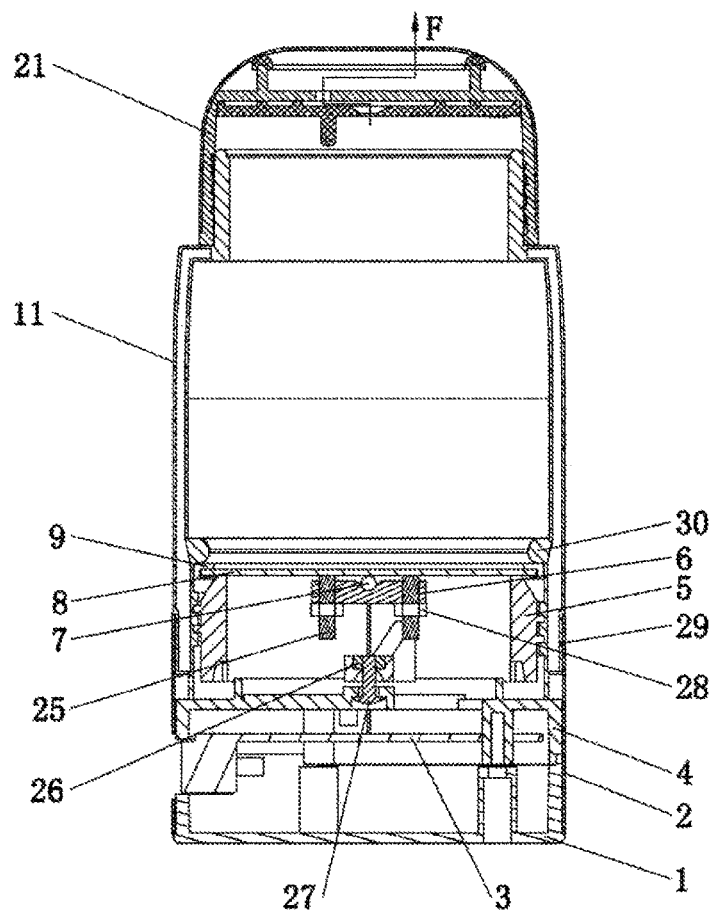
FIG. 7 is the structure schematic of the present invention in another state of use.

The upper end of the said boiling cup 11 is screwed with the lower end of the distill cup 19; and the upper end of distill cup 19 is screwed with the lid 21, wherein the upper ends of boiling cup 11 and the distill cup 19 are provided with external threads; the secondary sealing ring 15 is arranged between the upper end of boiling cup 11 and the lower end of distill cup 19. The upper ends of both boiling cup 11 and distill cup 19 are designed to be the same size. After taking the distill cup 19 and the coffee bucket 13, the lid 21 can be connected to the upper end of boiling cup 11 to boil water by the boiling cup 11, as showed in FIG. 7.

The outer circumference at the middle portion of the distill cup 19 is concave to form a grip.

The upper end of the said distill tube 20 is provided with a cap 32 and there is a gap left between the distill tube 20 and the cap 32.

The bottom of the said coffee bucket 13 is provided with a steam pipe 12, which is led to the inside of coffee bucket 13 and boiling cup 11; the bottom and the top inside the coffee bucket 13 are provided with a lower mesh 14 and an upper mesh 16, respectively.

The said lid 21 comprises the body of lid 43, the metal jacket 42 and the silicone disc 41; the metal jacket is arranged outside of the cup lid 43, which extends out of the shroud 39, and the tertiary sealing ring 38 is set between the top 5 of shroud 39 and the metal jacket 42, thereby forming a pressure relief chamber 35 at the top of cup lid 43 and the top surface inside the metal jacket 42 through shroud 39. The silicone disc 41 is placed on the top surface inside the cup lid 43. The said silicone disc 41 is installed with the first relief hole 36 on the surface, the cup lid 43 is arranged with the second relief hole 37 on the top surface, and the metal jacket is provided with the third relief hole 34 on the top surface; the first relief hole 36 is offset from the second relief hole 37; and the second relief hole 37 is offset from the third relief hole 34. The said silicone disc 41 is provided with an annular rib 40 on the top surface, which surrounds outside of the first relief hole 36 and the second relief hole 37.

The working principle of the present invention: as shown in FIG. 5, when in use, the distill cup 19 and the coffee bucket 13 are removed, add water C into the boiling cup 11, and add ground coffee H into the coffee bucket 13. Then, connect the distill cup 19 and the coffee bucket 13 to the boiling cup 11. When the power source is turned on, the heating plate 9 is started under the set procedure of the control circuit 3, so that the water C in the boiling cup 11 is boiled and a large amount of water vapor D is generated. Since the boiling cup 11 is sealed at the junction of the distill cup 19, the steam D can flow only through the steam pipe 12 to the coffee bucket 13, and the ground coffee treated with the high-temperature hydrothermal steam D forms the fragrant coffee liquid E, which flows into the distill cup 19 through the distilling tube.

Since the coffee liquid E stored in distill cup 19 is high in temperature, so more water vapor F is released, and the water vapor F flows through the first relief hole 36 and the second relief hole 37 into the pressure relief chamber 35 and then discharged out from the third relief hole 34. When the water in boiling cup 11 is dried by heating, the temperature of heating plate 8 will be 100° C. or more; the thermistor 7 will feed the temperature signal back to the control circuit board 3 to stop the heating plate 8 in time through the control circuit board 3.

Additionally, the lid 21 also has the function of leak-preventing. Since the diameter of the first relief hole 36 of the silicone disc 41 is very small, the annular rib 40 on the top surface of the annular rib 41 causes a certain deformation gap between the silicone disc 41 and the cup lid 43. When the boiling cup 11 or the distill cup 19 to which the lid 21 is connected is tilted, the liquid in the cup has not yet completely entered the first relief hole 36, and under the pressure of the liquid, the silicone disc 41 deforms to the direction of the inner top surface of cup lid 43 and covers the second relief hole 37, thereby blocking the passage of the lid 21 from the outside and preventing the water leakage.

What is claimed is:

1. An on-board coffee processor, comprising a boiling cup (11), a coffee bucket (13), a distill cup (19) and a lid (21); an upper end of the boiling cup (11) is connected with a lower end of the distill cup (19); the coffee bucket (13) is arranged at a rim of the boiling cup (11); the distill cup (19) is provided with a distill tube (20); a lower end of the distill tube (20) leads to the coffee bucket (13); a bottom of the distill cup (19) and an upper end of the tube (20) leads to an upper part of the distill cup (19); the lid (21) is connected to an upper end of the distill cup (19), a bottom of the boiling cup (11) is open, and an inner side at a lower end of the boiling cup is provided with a flange (30): the heating plate (8) is pressed against a bottom of the flange (30) by a heat-resistant bracket (5); a primary sealing ring (9) is arranged between the heating plate (8) and the flange (30); an outer circumference of the heat-resistant bracket (5) is connected with the inner side at the lower end of the boiling cup (11) by screw-thread fit, and a thermistor (7) is installed at a bottom of the heating plate (8).

2. The on-board coffee processor as claimed in claim 1, wherein the thermistor (7) is pressed against the bottom of the heating plate (8) by means of a holding block (6), and a connecting component for fixing the holding block (6) is provided at the bottom of the heating plate (8).

3. The on-board coffee processor as claimed in claim 2, wherein the connecting component comprises a stud (25) and a nut (28); the stud (25) is arranged at the bottom of heating plate (8), and the stud (25) of the holding block (6) is provided with a hole (23), and the stud (25) is connected with the nut (28) after passing through the hole (23).

4. The on-board coffee processor as claimed in claim 2 is characterized in that the holding block (6) is provided with a groove (24) in which the thermistor (7) is placed.

5. The on-board coffee processor as claimed in claim 1, wherein the boiling cup (11) is provided with a cup seat and a control circuit board (3) at the bottom; the control circuit board (3) is arranged in the cup seat, and the heating plate (8) and the thermistor (7) are electrically connected with the control circuit board (3).

6. The on-board coffee processor as claimed in claim 5, wherein the cup seat comprises a top cap (4), a shell (2) and a bottom cap (1); a center of the top cap (4) is connected with center of the heat-resistant bracket (5) by a screw (27), and the shell (2) is sheathed on the top cap and an outer circumference of the bottom cap (1); the boiling cup (11) is provided with an upper limit retainer (10); the bottom cap (1) is installed with a lower limit retainer (45) at a lower end of the shell (2); the top cap and the bottom cap (1) are connected by screws; and the shell (2) is crimped between the upper limit retainer (10) and the lower limit retainer (45).

7. The on-board coffee processor as claimed in claim 1, wherein the boiling cup (11) and/or the distill cup (19) has/have a double-layer structure, and an inner layer of the double-layer structure is a vacuum insulation layer (44).

8. The on-board coffee processor as claimed in claim 1, wherein the boiling cup (11) is screwed with the lower end of the distill cup (19); and the upper end of the distill cup (19) is screwed with the lid (21), wherein the upper ends of the boiling cup (11) and the distill cup (19) are provided with external threads; a secondary sealing ring (15) is arranged between the upper end of the boiling cup (11) and the lower end of the distill cup (19).

9. The on-board coffee processor as claimed in claim 1, wherein the coffee bucket (13) is provided with a steam pipe (12), which is led to interior portions of the coffee bucket (13) and the boiling cup (11); a bottom side and a top side of the interior portion of the coffee bucket (13) are provided with a lower mesh (14) and an upper mesh (16), respectively.

10. The on-board coffee processor as claimed in claim 3, wherein the holding block (6) is provided with a groove (24) in which the thermistor (7) is placed.

* * * * *